United States Patent [19]

Loest et al.

[11] 4,033,842
[45] July 5, 1977

[54] PRODUCTION OF MONOBASIC POTASSIUM PHOSPHATE BY ELECTRODIALYSIS

[75] Inventors: Kent W. Loest, Broomfield; John T. Schaefer, Boulder, both of Colo.

[73] Assignees: Southwire Company, Carrollton, Ga.; National Steel Corporation, Pittsburgh, Pa.; Earth Sciences, Inc., Golden, Colo.

[22] Filed: Apr. 26, 1976

[21] Appl. No.: 680,333

Related U.S. Application Data

[63] Continuation-in-part of Ser. No. 608,628, Aug. 28, 1975, abandoned.

[52] U.S. Cl. .................... 204/180 P; 423/120; 423/127
[51] Int. Cl.² ............. B01D 13/02; C01B 15/16; C01B 25/26
[58] Field of Search .......... 423/127, 120, 305, 127, 423/629, 181, 307–313, 128, 132; 204/180 P

[56] References Cited

UNITED STATES PATENTS

| | | |
|---|---|---|
| 1,386,031 | 8/1921 | Silsbee ............................ 423/128 |
| 3,436,176 | 4/1969 | Spedden et al. ............... 423/127 X |
| 3,647,370 | 3/1972 | Kearley ............................ 423/127 |
| 3,673,068 | 6/1972 | Seko et al. .................... 204/180 P |
| 3,752,749 | 8/1973 | Chlanda et al. ............... 204/180 P |
| 3,890,425 | 6/1975 | Stevens et al. ............... 423/120 X |

Primary Examiner—Arthur C. Prescott
Attorney, Agent, or Firm—Van C. Wilks; Herbert M. Hanegan; Stanley L. Tate

[57] ABSTRACT

A continuous process for the production by electrodialysis of monobasic potassium phosphate from phosphoric acid produced by the wet process and potassium sulfate produced as a by-product in processes for the recovery of aluminum from alunite.

34 Claims, 6 Drawing Figures

PRODUCTION OF MONOBASIC POTASSIUM PHOSPHATE BY ELECTRODIALYSIS

This is a continuation-in-part of application Ser. No. 608,628, filed Aug. 28, 1975, now abandoned.

CROSS-REFERENCE TO RELATED APPLICATIONS

The present invention utilizes potassium sulfate produced as a by-product in the processes for recovering aluminum from alunite ore disclosed in U.S. Pat. Nos. 3,890,425 and 3,890,426 assigned to a common assignee with this application. The combined processes of these two patents are referred to hereinafter at the basic process.

BACKGROUND OF THE INVENTION

The invention lies in the field of processes for the recovery of aluminum from its ores and/or the manufacture of monobasic potassium phosphate from apatite ore.

The present invention is a combination of the process for producing phosphoric acid from apatite rock by the wet process and the production of aluminum from alunite in accordance with the basic process, the present process resulting in the continuous production of aluminum and monobasic potassium phosphate as the products. In the operation of the process, phosphoric acid produced by the treatment of apatite rock with sulfuric acid is cycled directly to the basic process where it is subjected to electrodialysis with by-product potassium sulfate from the basic process to produce monobasic potassium phosphate.

The basic process is defined by the following process steps, some of which are optional, as illustrated in the flow diagram of the referenced patents:

1. roasting particulate alunite concentrate to remove water of hydration;
2. removing sulphur compounds and alkali metal compounds, including potassium sulfate, from the roasted ore either by the procedure of U.S. Pat. No. 3,890,425 in which the roasted ore is subjected to a reducing roast and then to an oxidizing roast followed by leaching with solvent, such as water or an alkali metal hydroxide, or by the process of U.S. Pat. No. 3,890,426 in which the roasted ore is leached in ammonium or alkali metal hydroxide, each alternate procedure terminating in a leaching step and leaving a residue containing aluminum values;
3. digesting the residue from the leaching step with alkali metal hydroxide solution to convert aluminum values in the residue to soluble aluminate;
4. precipitating silica from the resulting solution of step (3) to leave a solution of aluminate and a residue known as a desilication product consisting essentially of sodium aluminum silicate along with other impurities;
5. precipitating aluminum values from the solution of step (4); and
6. recovering product aluminum from the aluminum values of step (5).

The expression "roasting and leaching to remove water and compounds of sulfur and alkali metals" as used herein includes the two procedures of step (2) above.

The recited basic process includes the altenative of recovering by-product potassium sulfate by crystallization as disclosed in U.S. Pat. No. 3,890,426 in which some potassium sulfate is bled off from the crystallization step. This potassium sulfate bleed stream is included in the term "by-product potassium sulfate" from the basic process referred to herein.

Processes for the production of aluminum and monobasic potassium phosphate must be as economical as possible in order to produce competitive commercial grade products. This necessarily means conducting the production processes with a minimum of process steps and the recovery and utilization of as many by-products as possible. The combination of processes for the production of two or more products with the elimination of processing steps and the recovery and reuse in the combined process of materials which are normally by-products in the single processes is a distinct advantage. This is particularly true in this instance in which the organization producing the products by different processes is the owner of ore bodies containing ores from which the two products are produced by disconnected processes.

In the production of phosphoric acid from apatite rock by the wet process for sale as such or for use in the manufacture of fertilizer, a high purity product is required to make it commercial grade. Concentration and other purification steps are necessary as it cannot be marketed or used in the impure form in which it is produced. The purification procedure is a substantial item of expense in the production of a saleable product. A further problem in the use of the wet process phosphoric acid to manufacture monobasic potassium phosphate is that sulphate contamination of the product is a problem. If the raw phosphoric acid could be used without purification to make a commercial grade product, such as fertilizer which is saleable with a minimum of purification, it would result in a realization of a higher profit for the phosphoric acid itself due to the elimination of the purification steps. This is especially true when the product is monobasic potassium phosphate because its value and marketability is much greater than that of phosphoric acid and potassium sulfate combined.

Likewise, the recovery of potassium sulfate from potassium sulfate solution resulting from the first leaching step of the basic process normally requires evaporation, crystallization, and other procedures to produce a commercial grade product, all of which add to the cost of producing the potassium sulfate for sale. Accordingly, as is true with raw phosphoric acid produced by the wet process, if the impure potassium sulfate could be used to produce a commercial grade product, such as, monobasic potassium phosphate, the profit realized for the by-product potassium sulfate from the basic process would in the end be increased as the expensive purification procedures would be eliminated.

Accordingly, it is an object of this invention to provide a combined process for producing phosphoric acid from apatite rock and aluminum from alunite ore in which process monobasic potassium phosphate is produced from the raw phosphoric acid and raw by-product potassium sulfate from the aluminum production process, with the result that processing steps are eliminated and by-products and normally discarded materials are recovered and re-used in the combined process.

SUMMARY OF THE INVENTION

The invention is a combination of the wet process for producing raw phosphoric acid by the reaction of sulfuric acid with apatite rock and the basic process for production of aluminum from alunite ore, in which the combined continuous process raw phosphoric acid is cycled to the basic process where it is subjected with raw byproduct potassium sulfate to an electrodialysis step to produce monobasic potassium phosphate. As a result of the combined process, substantially commercial grade aluminum and monobasic potassium phosphate are produced with the use of reagents which are normally difficult to sell or are discarded and with the elimination of expensive recovery and purification steps.

DESCRIPTION OF THE PREFERRED EMBODIMENT

Figure 1:
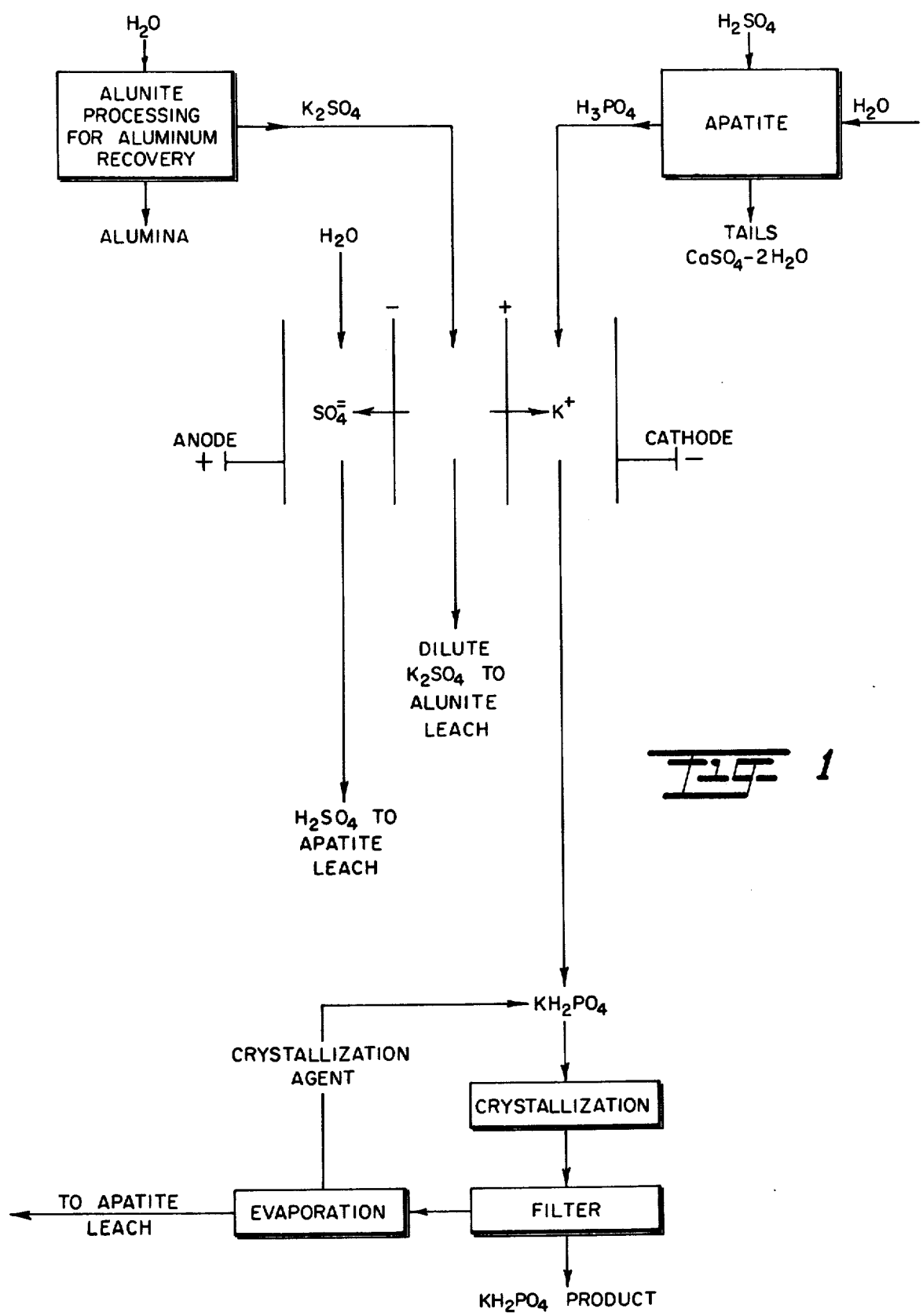
FIG. 1 is a diagrammatic flow sheet of the process of the invention showing the electrodialysis cell schematically.

Referring to the flow diagram of FIG. 1 illustrating the continuous process of the invention, it will be seen that alunite ore is processed by the basic process to recover aluminum and produce by-product potassium sulfate as apatite ore is treated with sulfuric acid by the wet process to produce phosphoric acid. The raw by-product potassium sulfate and the raw phosphoric acid report to the electrodialysis cell where monobasic potassium phosphate solution is produced at the cathode and sulfuric acid is produced at the anode. Monobasic potassium phosphate is crystallized from its solution with an organic solvent, such as, acetone or alcohol, and recovered by filtration. The crystallization agent is recovered from the mother liquor by vaporation and recycled to crystallization while the mother liquid is sent to the apatite leach. Alternatively, the $KH_2PO_4$ may be crystallized by normal vacuum crystallization.

Figure 2:
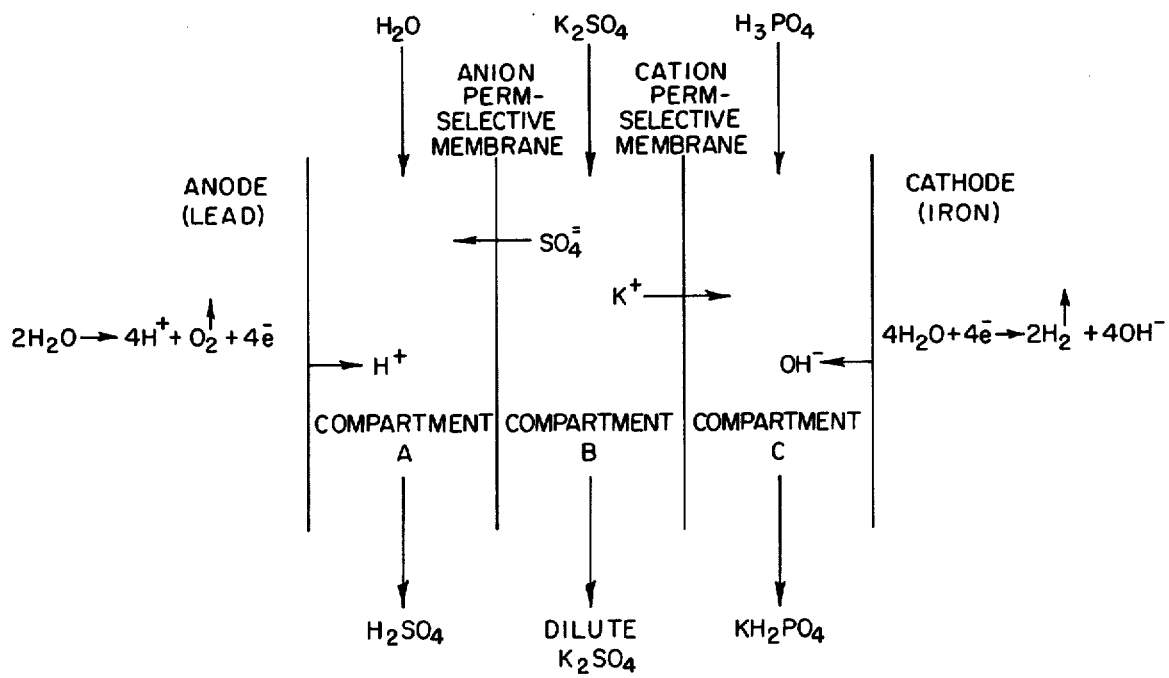
FIG. 2 is a schematic showing of an electrodialysis cell used for testing the invention, the cell comprised of a single frame made up of three compartments.

Referring to FIG. 2, the cell is comprised of an anode and cathode having an anion permselective membrane adjacent the anode and a cation permselective membrane adjacent the cathode. By this arrangement, the cell is divided into an anion compartment A, a cation compartment C and an intermediate liquor compartment B.

By the arrangement shown, sulfate anion travels through the anion permselective membrane into the anode compartment to form sulfuric acid with the water being introduced there while potassium cations travel through the cation permselective membrane to form monobasic potassium phosphate with the phosphoric acid being introduced into the cathode compartment.

Figure 4:
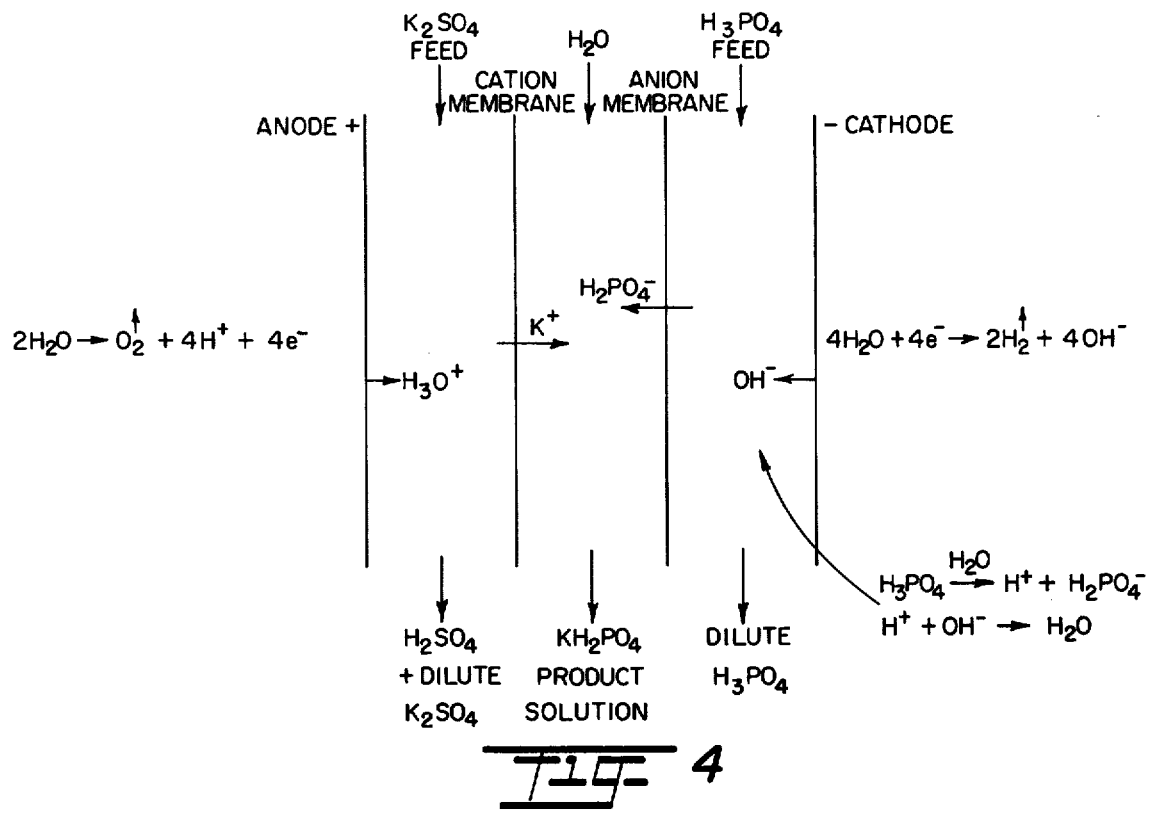
FIG. 4 is a schematic showing of a three compartment single frame electrodialysis cell of the type shown in FIG. 2 having a different arrangement of membranes.

In the description and the claims, the three and four compartment units of the cells of FIGS. 2 and 4, respectively, will be referred to as frames in accordance with the nomenclature used in U.S. Pat. No. 3,136,710. The letters A and C in FIGS. 5 and 6 refer to anion permselective membrane and cation permselective membrane, respectively.

Figure 3:
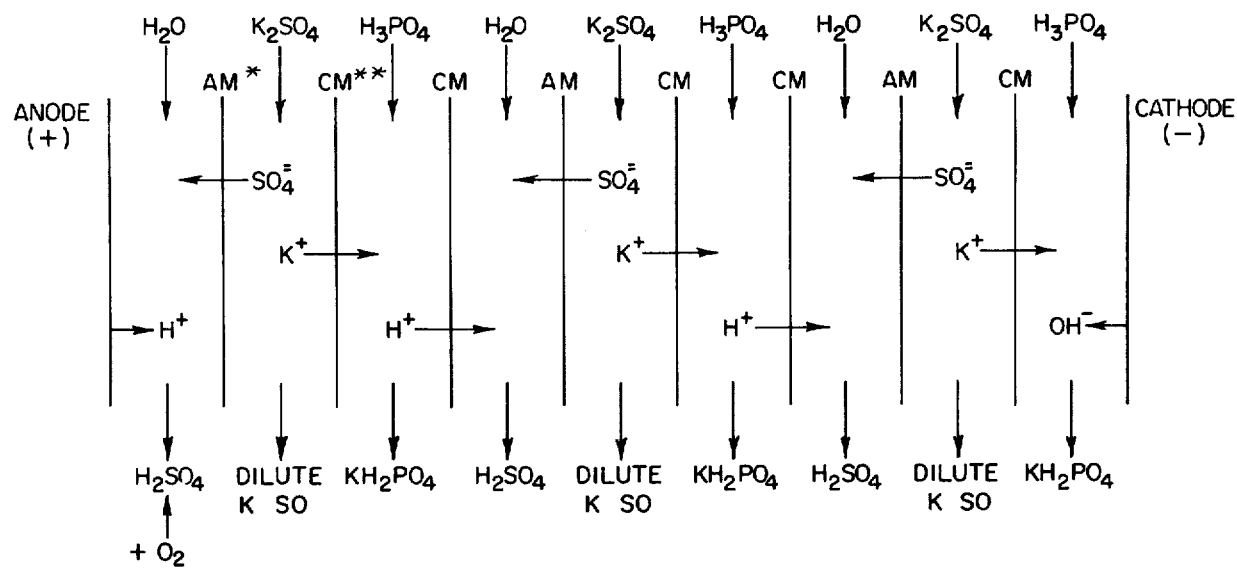
FIG. 3 is a schematic showing of a multi-frame electrodialysis cell comprised of three of the frames of the cell of FIG. 2.
Figure 5:
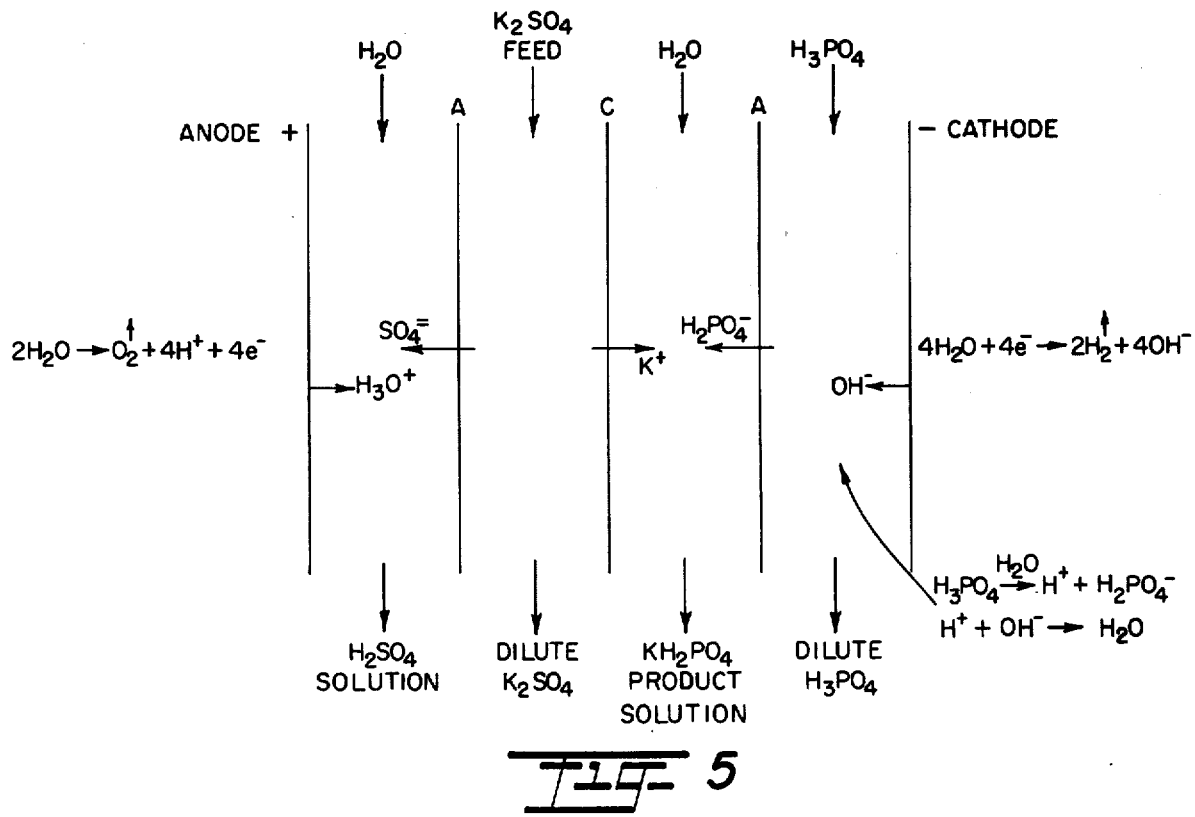
FIG. 5 is a schematic showing of a four compartment single frame electrodialysis cell of the invention.
Figure 6:
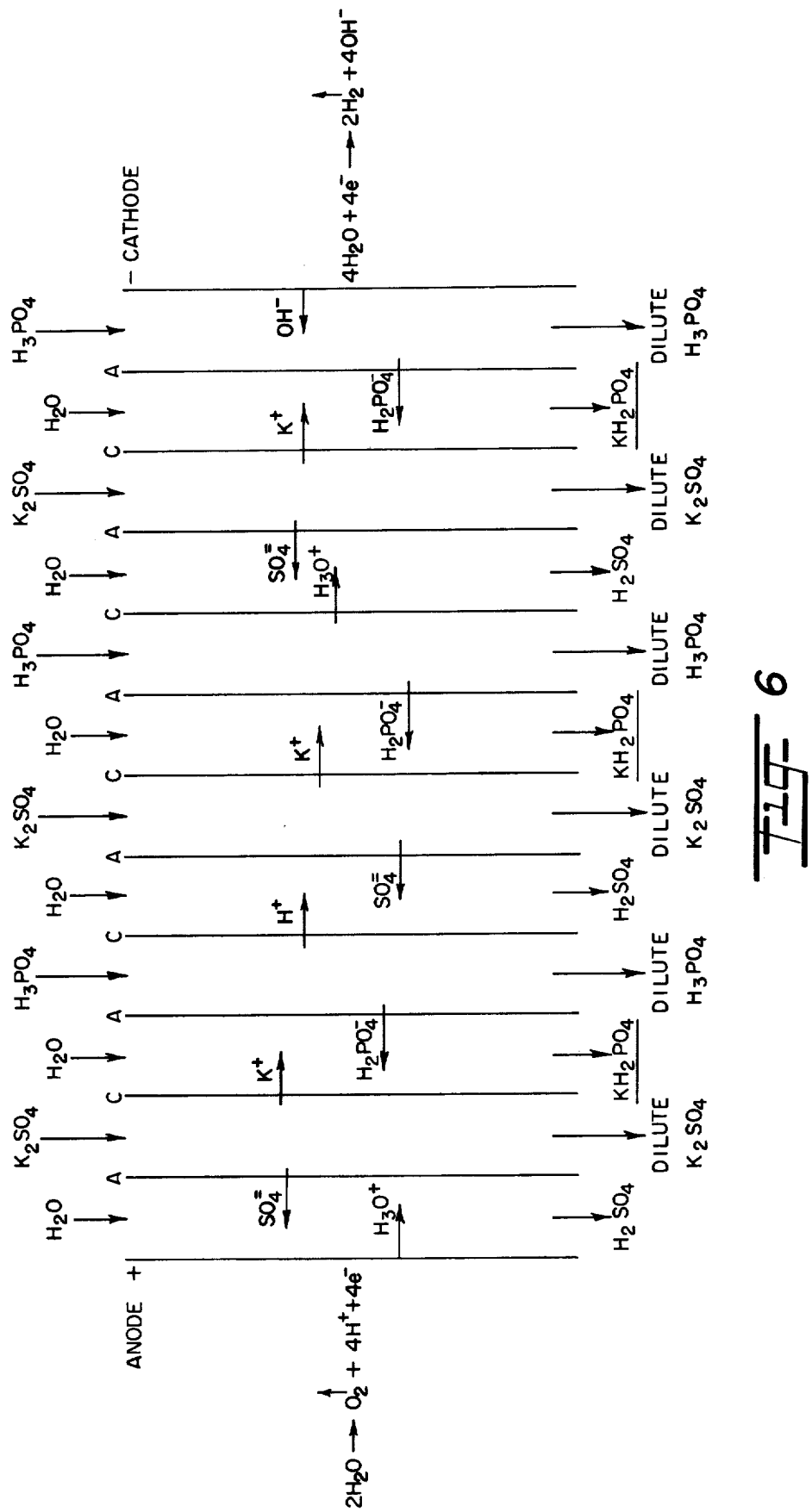
FIG. 6 is a schematic showing of a multi-frame electrodialysis cell comprised of three of the frames of the cell of FIG. 5.

Referring to FIGS. 3 and 6, the multiple frame cells are made up of three of the frames comprising the cells of FIGS. 2 and 5, respectively. The operation of each of the frames of the cells of FIGS. 3 and 6 are identical to that of the single frame cells of which they are comprised with the result that a significant economy in electrical energy consumed is achieved as multiple frames are operated by two electrodes.

Electrodialysis procedure for other applications is fully disclosed in the prior art. A full description of the electrodialysis procedure and equipment for upgrading brakish water is given in the book entitled *The Demineralization by Electrodialysis* edited by J. R. Wilson, London, Bufferworths Scientific Publications 1960. Other conventional electrodialysis cells and procedures for operating them are fully disclosed in U.S. Pat. No. 3,869,364. The disclosure of this patent includes conventional anion and cation permselective membranes. U.S. Pat. No. 3,136,710 discloses the advantages obtained by using multiple frame electrodialysis cells.

The reaction between by-product potassium sulfate and phosphoric acid which takes place in the electrodialysis cell to produce monobasic potassium phosphate and by-product sulfuric acid will now be described with reference to FIG. 2.

The $K^+$ and $SO^-_4$ ions in solution are fed into the central cell compartment as water is fed into the anion compartment and phosphoric acid into the cation compartment. The electromotive driving force created by placing a potential across the two electrodes causes the ions to migrate through the membranes separating the cell compartments. Because of the arrangement of electrodes and permselective membranes shown in the cell of FIG. 2, potassium ions migrate to the cation compartment through which a stream of phosphoric acid flows to produce a monobasic potassium phosphate, and sulfate ions migrate to the anion compartment through which a stream of water is flowing to produce sulfuric acid. The loss of potassium and sulfate ions from compartment B, the central compartment, leaves a dilute potassium sulfate solution in this compartment.

The following type of ionic reactions are believed to take place in compartment C at the cathode to produce $KH_2PO_4$.

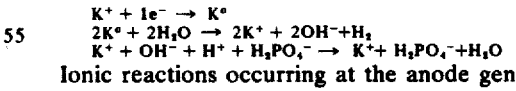

Ionic reactions occurring at the anode generally include the following: sulfate ions ($SO^-_4$) migrate through the anion permeable membrane into the anion compartment where the following type of electrode reactions are believed to take place to form $H_2SO_4$:

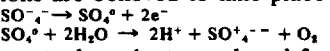

The actual products produced from the systems are $KH_2PO_4$, $H_2SO_4$, $H_2$, and $O_2$.

The monobasic potassium phosphate stream goes to a crystallization step where it is crystallized in the presence of acetone or alcohol or other organic liquid or by vacuum crystallization. The organic liquid is recovered by distillation and condensation and returned to the crystallization step.

Monobasic potassium phosphate produced by this method is quite pure, not having the $SO_4^{--}$ contamination normally found in monobasic potassium phosphate made by the wet digestion approach.

Assignees of this application are owners of apatite mines and alunite mines. Apatite rock from the apatite mine is shipped to the Alunite plant, reacted with sulfuric acid from the plant to produce phosphoric acid which is reacted with by-product potassium sulfate from the alunite processing. A combination of potassium and phosphorus into a readily soluble fertilizer product is ideal. Potassium phosphate fertilizers have an extremely high plant food value and can be combined with ammonia on or off plant site.

A number of successful tests have been made with single and multiple frame cells of the invention converting separate streams of raw by-product potassium sulfate and raw phosphoric acid to a product stream of monobasic potassium phosphate. The procedure by which potassium sulfate is formed as a by-product in the basic process is disclosed in the above-referenced U.S. Pat. Nos. 3,890,425 and 3,890,426. For the tests, a lead anode and an iron cathode were used. Conventional anion and cation permselective membranes having high resistance to strong acid solution were used. The cell had a plexiglas frame work, and was designed with the membranes separating the cell compartments placed between ½ inch pieces of cut-out plexiglas through which the liquid streams flowed. The plexiglas pieces were cut out in an S configuration to give a good flow distribution over the membrane surfaces. The actual surface area of each membrane exposed to liquid flow was 40 square inches. The power supply used was a 0–16 volt variable range D.C. supply with a maximum output of 10 amperes.

In this controlled laboratory testing using the single frame cell of FIG. 2, $KH_2PO_4$ solution was produced in an attempt to measure the efficiency of the cell considering the chemical conversion and a cost analysis based on the power consumed.

The first test involved the feasibility of $KH_2PO_4$ formation by using a 50 g/l $K_2SO_4$ stream and a 75 g/l $H_3PO_4$ stream in compartments B and C respectively. The reaction proceeded at 6 volts potential drawing as much as 4.5 amps continuous current. Samples taken at various times showed a continuous transfer of $K^+$ ions into compartment C of the cell, the final product solution sample having a K:P ratio of 1:1. This ratio begins to approach closely that of a theoretical pure solution of $KH_2PO_4$ which would have a K:P ratio of 1.25:1. The final solution concentration as $KH_2PO_4$ was 60 g/l based on the amount of potassium present in the product solution.

A second test was performed to measure cell efficiency over a short period of time. A comparison was made between the current consumed and the amount of product formed. According to Faraday's Law, it requires 96,500 coulombs of electrical energy to chemically convert one equivalent of a substance. Based on this law, the conversion of $KH_2PO_4$ actually showed an efficiency of greater than 100%, indicating that the coulombs of energy put into the system are less than the coulombs which should have been consumed by the cell based on $K^+$ migration into cell C. At present, no explanation for this phenomenon can be offered, but it appears in almost every type of test that has been attempted with the single frame cell. A possible explanation for the high efficiencies is osmosis.

Another attempt to produce a $KH_2PO_4$ solution involved feeding a stream of $(NH_4)_2\ SO_4-K_2SO_4$ mixture rather than $K_2SO_4$ solution alone into compartment B. The resulting solution was precipitated with alcohol and a favorable yield of crystals obtained having good N-K-P levels. This test simulates conditions which can be obtained when ammonia leach is used.

The actual indicated current flowing in the electrodialysis system involves a balanced consumption of electrons at the cathode and donation of electrons at the anode. The rate of migration of $K^+$ and $SO_4^{--}$ ions flowing from the central cell to their respective cell compartments determines the current flow by creating electrode reactions.

A cost analysis, based on the measured power consumed and the product produced for one test calculated out to about $11.00/ton of $KH_2PO_4$ produced for electricity consumption only. This acceptable figure is based on the assumption that 1 kilowatt hour of electricity would cost $0.015.

The following diagram illustrates the mechanism of $KH_2PO_4$ solution formation using the single frame four compartment electrodialysis unit of FIG. 4.

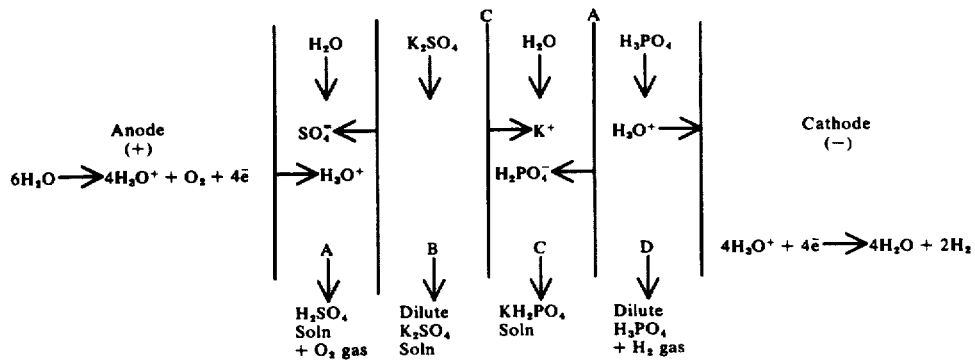

The overall mechanism by which this process proceeds in the single frame four compartment cell of the invention involves several steps. Feed streams of $H_2O$, $K_2SO_4$, $H_2O$ and $H_3PO_4$ are fed into compartments A, B, C and D, respectively. The individual compartments are separated by ion selective membranes which are chemically stable to the feed solutions and product streams.

The ion membranes are made of thin sheets of synthetic ion exchange resin containing fixed ion exchange groups. Cation permeable membranes permit the passage of cations selectively and anion permeable membranes permit the passage of anions selectively. The membranes are placed between the feed stream compartments to allow the proper migration of ions in the electrolyte solutions into adjacent cell compartments where product solution is formed.

The transport of ions from a solution phase through the resin phase is effected by an electromotive driving force. The cell units are placed between chemically stable electrodes and a direct current power supply is used to create a driving potential across these electrodes. The cathode takes a negative charge due to a build up of electrons. This in turn causes positive cations to be attracted in the direction of the cathode. The anode becomes deficient in electrons creating a positive polarity and anions tend to migrate toward it.

In the electrodialysis process, the electromotive force and ion transport is effected at the expenditure of electrical energy. This energy consumption takes place in the form of electrolysis at the electrodes. Pure water with a strongly ionized electrolyte dissolved in it becomes a good conductor. When the circuit of an electrolytic cell is closed, the cathode becomes negatively charged and positive ions migrate toward the cathode where they acquire electrons of high potential energy in a reduction process. Negatively charged ions, alternately, migrate toward the positive anode and are oxidized by giving up electrons of low potential energy.

The loss of electrons by the cathode and the acquisition of a like number of electrons by the anode is in effect the conduction of electricity through the cell. The conduction of electricity through an electrolyte solution together with the resulting chemical changes is electrolysis. The end result of electrolysis depends upon the nature of the electrolytes.

In the $KH_2PO_4$ electrodialysis setup, $H_3PO_4$ solution is present in the cathode compartment of the cell. A large amount of $H_3PO_4$ molecules undergo first degree ionization to form hydronium ions, $H_3O^+$, and dihydrogen phosphate ions, $H_2PO_4^-$. Water is also partially ionized giving a small amount of free Hydronium ion and an equal amount of hydroxyl ion, $OH^-$. These ionizations are represented by the following equations:

$$H_3PO_4 + H_2O \rightleftharpoons H_3O^+ + H_2PO_4^-$$
$$2H_2O \rightleftharpoons H_3O^+ + OH^-$$

When the circuit is closed, the positively charged $H_3O^+$ ions migrate to the negatively charged cathode where they are reduced forming hydrogen gas and water molecules.

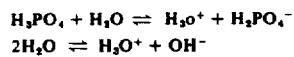

$$4H_3O^+ + 4e^- \rightarrow 4H_2O + 2H_2 \text{ (cathode reduction)}$$

This reaction in turn adds an additional driving force to the migration of $H_2PO_4^-$ ions from compartment D to compartment C because of the unbalanced ion equilibrium. Combined with the attracting force of the anode, $H_2PO_4^-$ ions begin to transfer into compartment C through the anion permeable membrane where they are met and balanced in charge by an equal number of $K^+$ ions transferring from compartment B through the cation permeable membrane to form a strongly ionized $KH_2PO_4$ solution in compartment C.

Negatively charged $SO_4^{--}$ ions from compartment B are attracted toward the anode in compartment A through the anion permeable membrane. At the same time, $OH^-$ ions from the weak ionization of water also migrate to the anode. Although the $SO_4^{--}$ concentration is greater than $OH^-$, the $OH^-$ ions from water ionization are preferentially oxidized, each ion giving up an electron to the anode. For every four $OH^-$ ions discharged, two molecules of water and one diatomic molecule of oxygen gas are formed.

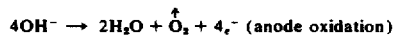

$$4OH^- \rightarrow 2H_2O + O_2 + 4e^- \text{ (anode oxidation)}$$

The removal of $OH^-$ ions from the solution disturbs the ionization equilibrium and additional water molecules ionize supplying additional $OH^- + H_3O^+$ ions. The formation of $H_3O^+$ ions is necessary to balance the charge of $SO_4^{--}$ ions migrating into compartment A to form an ionized solution of $H_2SO_4$. The overall net reaction in the anode compartment involves the ionization of water and the oxidation of hydroxide ions to give oxygen gas, hydronium ions and electrons.

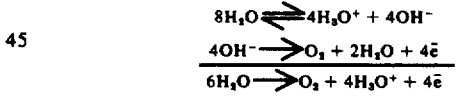

$$8H_2O \rightleftharpoons 4H_3O^+ + 4OH^-$$
$$4OH^- \rightarrow O_2 + 2H_2O + 4e^-$$
$$\overline{6H_2O \rightarrow O_2 + 4H_3O^+ + 4e^-}$$

The overall product capacity of the four compartment cell per Faraday of electricity at 100% current efficiency would be:

1. Compartment C — 1 eq. wt of $KH_2PO_4$ = 1 mole = 136g
2. Compartment A — 1 eq wt of $H_2SO_4$ = ½ mole = 49g
3. Anode — ¼ mole of $O_2$ = 5.6 liters at STP
4. Cathode — ½ mole of $H_2$ = 11.2 liters at STP An experimental trial using the cell design of diagram A incorporated chemically stable membranes placed between 9 inches × 9 inches × ¼ inches pieces of plexiglass to form cell compartments. The plexiglass dividers were cut out in S configuration to give a good flow distribution over the membrane surfaces.

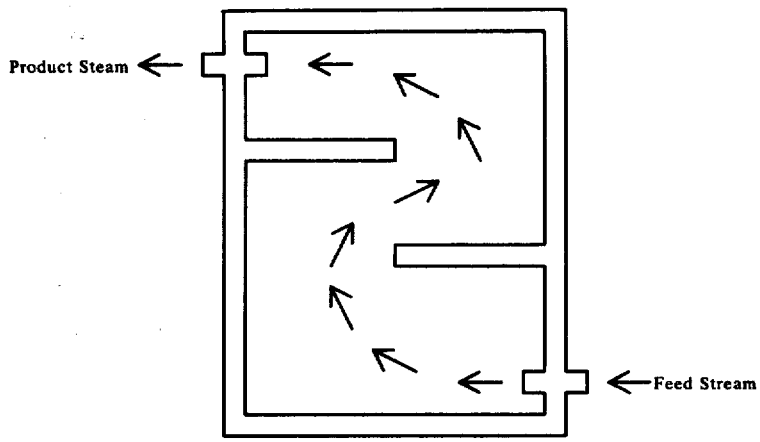

The actual surface area of each membrane exposed to liquid flow was 40 in². The power supply was a 0-16 volt variable range d-c source with a maximum output of 10 amps.

In controlled laboratory testing, $KH_2PO_4$ solution was produced in an attempt to measure the efficiency of the cell in making the chemical conversion and a cost analysis based on power consumed.

100 g/l $K_2SO_4$ soln and 33% $H_3PO_4$ soln were fed into cell compartments B and D respectively. Water streams were fed into compartments A and C. The individual streams were recycled continuously through each compartment over a 2.5 hour period. The current flowing was maintained at 5 amps. Analysis of the product streams showed a large depletion of $K_2SO_4$ and $H_3PO_4$ in compartments B and D, while $H_2SO_4$ and $KH_2PO_4$ had concentrated in compartments A and C. There was no potassium contamination in the $H_2SO_4$ product stream and no sulfate in the $KH_2PO_4$ product stream which indicates the membranes used were adequately selective to produce high grade products.

Current efficiency based on the amount of $KH_2PO_4$ produced was calculated by comparing the equivalent weight of potassium transferred to compartment C to the Faradays of electrical energy used. The final concentration of $K^+$ in solution in compartment C was 36.4 g/l which gave a final $KH_2PO_4$ concentration of 127 g/l in 480 ml of solution. The equivalents of $K^+$ present in cell C was 0.448 which corresponds to .448 Faradays of energy or 43,200 coulombs. The total energy supplied by the d-c power supply was 45,000 coulombs, or 0.466 Faradays. The ratio of the energy needed for product formation to the energy supplied gives a 96% current utilization, indicating a very high rate of exchange for the single frame electrodialysis unit.

Deviation from 100% current efficiency is mostly due to internal cell resistance, especially ohmic resistance at the membranes caused by resistance to ion transport and polarization effects (ion buildup at the membrane surfaces).

The continuous cost of production of product solution is dependent upon the kilowatt hours of electrical power supplied. At a cost of $0.01/kwh and based on the amount of $KH_2PO_4$ produced in this run, the electrical requirements per ton of potassium phosphate produced in solution would amount to $19.75.

A second cell was constructed using two frames of cell compartments in the following configuration:

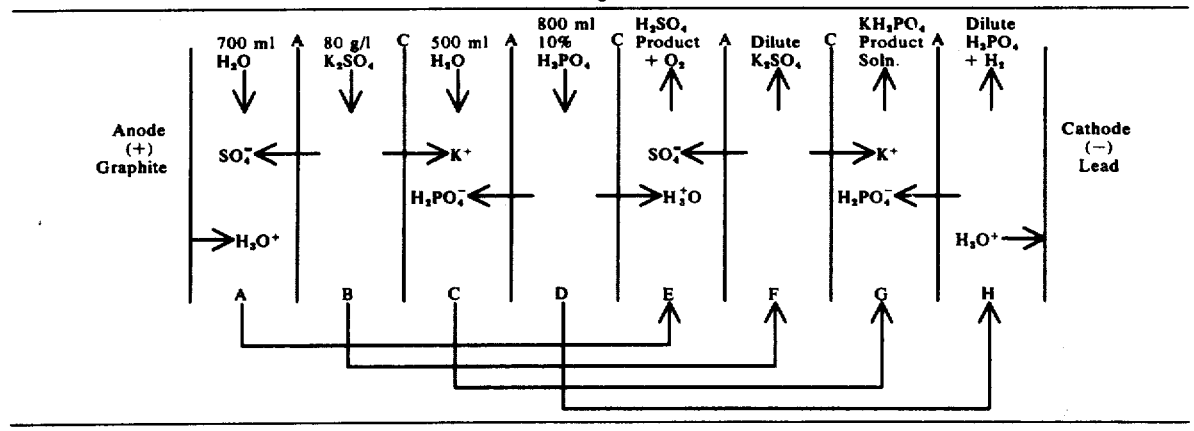

Diagram B

The feed streams into compartments A, B, C, and D are directly cycled into compartments E, F, G and H, respectively. Compartments E through H perform the same functions as compartments A through D in the single unit cell except that hydrogen ion in compartment D is transferred across a cation permeable membrane instead of undergoing electrolytic reduction. It migrates into compartment E where it forms $H_2SO_4$ solution with sulfate ion migrating from compartment F. This process does not consume electrical energy because it only involves physical ion migration. The above cell design, therefore, allows twice the theoretical yield of product per Faraday of energy consumed because compartments E through H duplicate the conversions of compartments A through D using only 1/2 the theoretical amount of current.

Calculation of current efficiency for the system is Diagram B gave 150% at a cost of $17.00 per ton of $KH_2PO_4$ conversion. These figures do not agree with the factor increase from the single unit cell. A possible explanation for the disagreement is the use of different anode material in the two cells. The single unit cell used a lead anode which showed signs of chemical attack during the cell run while a graphite electrode which is chemically inert to sulfuric acid was used in the multicompartment set-up. However, graphite has poor conductivity compared to metal which may have caused a greater power drain due to ohmic resistance. Selection of a chemically stable metal anode is recommended for better cell efficiency and lower production cost.

All of the products formed by the single frame three and four compartment cells of FIGS. 2 and 4 involve electrical conversion at the electrodes. Since most of the resistance in a single frame cell exists in the region of the electrodes, this involves electric consumption and cost. Accordingly, the more frames which can be feasibly used in a two electrode cell, the more efficient the cell is. A much more favorable result is obtained cost-wise by the use of a multiple frame electrodialysis cell like that shown in FIGS. 3 and 6, and the invention contemplates the use of these type cells which cooperate in accordance with the principle of the single frame cell disclosed in the schematic drawings of FIGS. 2 and 4, concentrating monobasic potassium phosphate in the phosphoric acid feed streams.

Potassium Dihydrogen Phosphate was produced in good yield from $K_2SO_4$ solution and $H_3PO_4$ solution using an electrodialysis cell containing two repeating frames of four cell compartment each. The process involves the migration of charged ions through ion selective membranes toward their respective electrodes. The cell is designed to allow $K^+$ and $H_2PO_4^-$ ions to migrate into common cell compartments containing $H_2O$ when a driving force potential is applied across the electrodes.

The multicompartment electrodialysis cell has distinct advantage over the single frame model. In multicell electrodialysis stacks, a large number of repeating cell units are placed between two electrodes. The electrode voltages become an insignificant fraction of the total voltage. Therefore, the electrode voltage becomes a decreasingly significant factor in the calculations of energy consumption, total voltage, and production capacity with increasing numbers of repeating cell units.

The single frame electrodialysis cells as used in the above described tests is basically an electrolytic cell with membranes. At 100% current efficiency, such a cell would produce only one equivalent weight of a substance per Faraday of current passed (96,500 coulombs). Because of the repitition of cell frames in the multicompartment electrodialysis stacks, the production capacity becomes an increasing factor of the number of cell frames, e.g., a multicompartment cell containing two frames of cell units would produce two equivalent weights of product for one Faraday of current passed assuming 100% theoretical current efficiency. The energy consumed by electrolysis takes place in the cell compartments housing the electrodes while only ion transport occurs through the central cell compartments consuming no electrical current, but producing product solution.

The use of electrodialysis in the production of a high grade potassium phosphate is a very suitable method for producing large quantities of the material from potassium sulfate and phosphoric acid. The importance of potassium and phosphorous to the fertilizer industry makes potassium phosphate a very marketable commodity. Current market indications place forms of potassium phosphate in the $600 to $800/ton range. Scale-up of electrodialysis units have been successful in many areas of industry and could prove very profitable in the present application.

While the invention has been illustrated by its application to alunite and apatite ores, it is not restricted to these ores as it is applicable to other aluminum and phosphate ores.

It is an advantage of the invention that the process can be performed continuously in conjunction with the production of aluminum from alunite and the production of phosphoric acid by the reaction of sulfuric acid on apatite ore, with the continuous production of monobasic potassium phosphate as continuous streams of phosphoric acid from the apatite processing and by-product potassium sulfate from the alunite processing are feed to the electrodialysis cell. Purification steps conventionally necessary to upgrade the phosphoric acid and potassium sulfate to produce salable products are eliminated as the phosphoric acid and potassium sulfate are introduced into the electrodialysis cell in the raw form without purification. Another advantage of the process is that substantially commercial grade monobasic potassium phosphate is produced due to the nature of the electrodialysis process in which only an acceptable amount of impurities are carried over into the product. Elimination of purification procedures for phosphoric acid and potassium sulfate is a significant economical advantage, particularly, when the product is monobasic potassium phosphate because its value and marketability is much greater than that of phosphoric acid and potassium sulfate combined.

What is claimed is:

1. In the combined process for producing phosphoric acid by treating apatite with sulfuric acid, and aluminum from alunite ore with the production of by-product potassium sulfate, the improvement which comprises converting the phosphoric acid and potassium sulfate to monobasic potassium phosphate by electrodialysis.

2. The process of claim 1 performed continuously.

3. A continuous process for producing aluminum and monobasic potassium phosphate from alunite ore and apatite ore which comprises:
  a. reacting apatite ore with sulfuric acid to produce phosphoric acid;
  b. roasting and leaching the alunite ore to remove water and compounds of sulfur and alkali metals resulting in a residue containing aluminum values and a solution containing potassium sulfate;
  c. digesting the residue from step (b) with at least one alkali metal hydroxide to convert substantially all of said aluminum values to soluble aluminate;
  d. removing silica from the aluminate formed in step (c);

e. recovering aluminum values from the aluminate remaining from step (d); and f. converting phosphoric acid from step (a) and potassium sulfate from step (b) to monobasic potassium phosphate by electrodialysis.

4. The process of claim 3 performed continuously.

5. The process of claim 3 in which in step (b) the roasted ore is subjected to a reducing roast followed by an oxidizing roast and leached with a solvent to remove compounds of sulfur and alkali metals.

6. The process of claim 3 in which the roasted ore in step (b) is subjected directly after roasting to a leach with ammonium hydroxide or an alkali metal hydroxide to remove compounds of sulfur and alkali metals.

7. A process for producing aluminum and monobasic potassium phosphate from alunite and apatite rock which comprises:

a. reacting apatite rock with sulfuric acid to produce phosphoric acid;
   b. roasting and leaching the alunite ore to remove water and compounds of sulfur and alkali metals resulting in a residue containing aluminum values and a solution containing potassium sulfate;
   c. digesting the residue from step (b) with at least one alkali metal hydroxide to dissolve substantially all of the aluminum values from said solid residue;
   d. separating the liquid and solid portions of the slurry resulting from step (c);
   e. removing silica from the liquid portion resulting from step (d) leaving a desilication product which is essentially sodium aluminum silicate;
   f. separating the liquid and solid portions resulting from step (e);
   g. precipitating aluminum hydroxide from the liquid portion resulting from step (e);
   h. recovering aluminum values from the aluminum hydroxide precipitate of step (g); and
   i. converting the phosphoric acid from step (a) and the potassium sulfate from step (b) by electrodialysis into monobasic potassium phosphate.

8. The process of claim 7 performed continuously.

9. The process of claim 7 in which in step (b) the roasted ore is subjected to a reducing roast followed by an oxidizing roast or alternatively a high temperature decomposition roast, and leached with a solvent to remove compounds of sulfur and alkali metals.

10. The process of claim 7 in which in step (b) the roasted ore is subjected directly after roasting to a leach with ammonium hydroxide or an alkali metal hydroxide to remove compounds of sulfur and alkali metals.

11. The process for producing monobasic potassium phosphate from phosphoric acid and potassium sulfate by electrodialysis in a single frame electrodialysis cell, said unit comprising: in successive positions, an anion compartment, an intermediate compartment, a cation compartment; an anion permselective membrane between the anion and intermediate compartments, a cation permselective membrane between the intermediate and cation compartments; the arrangement forming anion and cation compartments and an intermediate compartment, which process comprises: adding water to the anion compartment, potassium sulfate to the intermediate compartment, phosphoric acid to the cation compartment, and applying a direct current electrical potential across the electrodes to produce sulfuric acid in the anion compartment, dilute potassium sulfate in the central compartment and monobasic Potassium Phosphate in the cathode compartment.

12. The process of claim 11 in which the electrodialysis cell includes at least two of said frames and materials identical to those of claim 11 are added to like compartments.

13. The process of claim 1 in which the electrodialysis is performed in a single frame cell, said frame comprising, in successive positions, an anion compartment, an intermediate compartment, a cation compartment; an anion permselective membrane between the anion and intermediate compartments, a cation permselective membrane between the intermediate and cation compartments; the arrangement forming anion and cation compartments and an intermediate compartment; the process performed by adding water to the anode compartment, potassium sulfate solution to the intermediate compartment, phosphoric acid to the cation compartment, and applying a direct current electrical potential across the electrodes to produce sulfuric acid in the anion compartment, dilute potassium sulfate in the central compartment and monobasic potassium phosphate in the cation compartment.

14. The process of claim 13 in which the electrodialysis cell includes at least two of said frames and materials identical to those of claim 13 are added to like compartments.

15. The process of claim 13 in which the electrodialysis is performed in a single frame cell, said frame comprising, in successive positions, an anion compartment; an intermediate compartment, a cation compartment, an anion permselective membrane between the anion and intermediate compartments, a cation permselective membrane between the intermediate and cation compartments; the arrangement forming anion and cation compartmnets and an intermediate compartment; the process performed by adding water to the anion compartment, potassium sulfate solution to the intermediate compartment, phosphoric acid to the cation compartment, and applying a direct current electrical potential across the electrodes to produce sulfuric acid in the anion compartment, dilute potassium sulfate in the central compartment and monobasic potassium phosphate in the cation compartment.

16. The process of claim 15 in which the electrodialysis cell includes at least two of said frames and materials identical to those of claim 15 are added to like compartments.

17. The process of claim 7 in which the electrodialysis is performed in a single frame cell, said frame comprising, in successive positions, an anion compartment, an intermediate compartment, a cation compartment; an anion permselective membrane between the anion and intermediate compartments, a cation permselective membrane between the intermediate and cation compartments; the arrangement forming anion and cation compartments and an intermediate compartment; the process performed by adding water to the anion compartment, potassium sulfate solution to the intermediate compartment, phosphoric acid to the cation compartment, and applying a direct current electrical potential across the electrodes to produce sulfuric acid in the anion compartment, dilute potassium sulfate in the central compartment and monobasic potassium phosphate in the cation compartment.

18. The process of claim 17 in which the electrodialysis cell includes at least two of said frames.

19. A process for the manufacture of monobasic potassium phosphate from phosphoric acid and potassium sulfate which comprises, providing ionizable aqueous solutions in successive positions, said aqueous solutions comprising water, potassium sulfate and phosphoric acid, placing an anion permselective membrane between said water and potassium sulfate, placing a cation permselective membrane between said potassium sulfate and said phosphoric acid and, establishing a direct current electrical potential across said aqueous solutions.

20. An electrodialysis cell comprising, a single frame comprising in successive positions an anion compartment, an intermediate compartment, a cation compartment, an anion permselective membrane between said anion and intermediate compartments, a cation permselective membrane between said intermediate and cation compartments, and means for impressing a direct current electrical potential across aqueous solutions in said compartments.

21. The electrodialysis cell of claim 20 including at least two of said frames.

22. The process of claim 7 in which the conversion of phosphoric acid and potassium sulfate into monobasic potassium phosphate is performed in a single frame electrodialysis cell.

23. The process of claim 22 in which the electrodialysis cell includes at least two of said frames.

24. The process for producing monobasic potassium phosphate from phosphoric acid and potassium sulfate by electrodialysis in a single frame electrodialysis cell, said unit comprising: in successive positions, an anion compartment, a first intermediate compartment, a second intermediate compartment, and a cation compartment; an anion permselective membrane between the anion and first intermediate compartments, a cation permselective membrane between the intermediate compartments and an anion permselective membrane between the second intermediate and the cation compartments; the arrangement forming anion and cation compartments and two intermediate compartments; which process comprises: adding water to the anion compartment, potassium sulfate to the first intermediate compartment, water to the second intermediate compartment and phosphoric acid to the cation compartment, and applying a direct current electrical potential across the electrodes to produce sulfuric acid in the anion compartment, dilute potassium sulfate in the first intermediate compartment, monobasic potassium phosphate in the second intermediate compartment, and dilute phosphoric acid in the cation compartment.

25. The process of claim 24 in which the electrodialysis cell includes at least two of said frames and materials identical to those of claim 24 are added to like compartments.

26. The process of claim 1 in which the electrodialysis is performed in a single frame cell, said frame comprising, in successive positions, an anion compartment, a first intermediate compartment, a second intermediate compartment, and a cation compartment; an anion permselective membrane between the anion and first intermediate compartments, a cation permselective membrane between the intermediate compartments and an anion permselective membrane between the second intermediate and cation compartments, the arrangement forming anion and cation compartments and two intermediate compartments; the process performed by adding water to the anode compartment, potassium sulfate solution to the first intermediate compartment, water to the second intermediate compartment and phosphoric acid to the cation compartment, and applying a direct current electrical potential across the electrodes to produce sulfuric acid in the anion compartment, dilute potassium sulfate in the first intermediate compartment, monobasic potassium phosphate in the second intermediate compartment, and dilute phosphoric acid in the cation compartment.

27. The process of claim 26 in which the electrodialysis cell includes at least two of said frames and materials identical to those of claim 26 are added in like compartments.

28. The process of claim 3 in which the electrodialysis is performed in a single frame cell, said frame comprising, in successive positions, an anion compartment, a first intermediate compartment, a second intermediate compartment, a cation compartment, an anion permselective membrane between the anion and intermediate compartments, a cation permselective membrane between the intermediate compartments and an anion permselective membrane between the second intermediate and cation compartments, the arrangement forming anion and cation compartments and two intermediate compartments; the process performed by adding water to the anion compartment, potassium sulfate solution to the first intermediate compartment, water to the second intermediate compartment and phosphoric acid to the cation compartment, and applying a direct current electrical potential across the electrodes to produce sulfuric acid in the anion compartment, dilute potassium sulfate in the first intermediate compartment, monobasic potassium phosphate in the second intermediate compartment, and dilute phosphoric acid in the cation compartment.

29. The process of claim 28 in which the electrodialysis cell includes at least two of said frames and materials identical to those of claim 28 are added to like compartments.

30. The process of claim 7 in which the electrodialysis is performed in a single frame cell, said frame comprising, in successive positions, an anion compartment, a first intermediate compartment, a second intermediate compartment, and a cation compartment, an anion permselective membrane between the anion and first intermediate compartments, a cation permselective membrane between the intermediate compartments, and an anion permselective membrane between the second intermediate compartment and the cathode compartment; the arrangement forming anion and cation compartments and two intermediate compartments; the process performed by adding water to the anion compartment, potassium sulfate solution to the first intermediate compartment, water to the second intermediate compartment, and phosphoric acid to the cation compartment, and applying a direct current electrical potential across the electrodes to produce sulfuric acid in the anion compartment, dilute potassium sulfate in the first intermediate compartment, monobasic potassium phosphate in the second intermediate compartment, and dilute phosphoric acid in the cation compartment.

31. The process of claim 30 in which the electrodialysis cell includes at least two of said frames and materials identical to those of claim 30 are added to like compartments.

32. A process for the manufacture of monobasic potassium phosphate from phosphoric acid and potassium sulfate which comprises, providing ionizable aqueous solutions in successive positions, said aqueous solutions comprising water (1), potassium sulfate, water (2) and phosphoric acid, placing an anion permselective membrane between said water (1) and potassium sulfate, placing a cation permselective membrane between said potassium sulfate and said water (2) and placing an anion permselective membrane between said water (2) and said phosphoric acid and, establishing a direct current electrical potential across said aqueous solutions.

33. An electrodialysis cell comprising, a single frame comprising in successive positions an anion compartment, a first intermediate compartment, a second intermediate compartment, a cation compartment, an anion permselective membrane between said anion and first intermediate compartments, a cation permselective membrane between said intermediate compartments, an anion permselective membrane between said second intermediate compartment and said cation compartment, and means for impressing a direct current electrical potential across aqueous solutions in said compartments.

34. The electrodialysis cell of claim 32 including at least two of said frames.

* * * * *